US012760936B2

(12) United States Patent
Adel

(10) Patent No.: US 12,760,936 B2
(45) Date of Patent: Oct. 13, 2026

(54) PARABOLIC TROUGH COLLECTOR

(71) Applicant: Solabolic GmbH, Vienna (AT)

(72) Inventor: Ahmed Adel, Vienna (AT)

(73) Assignee: SOLABOLIC GMBH, Vienna (AT)

( * ) Notice: Subject to any disclaimer, the term of this patent is extended or adjusted under 35 U.S.C. 154(b) by 1150 days.

(21) Appl. No.: 17/779,121

(22) PCT Filed: Nov. 20, 2020

(86) PCT No.: PCT/EP2020/082839
§ 371 (c)(1),
(2) Date: May 23, 2022

(87) PCT Pub. No.: WO2021/121858
PCT Pub. Date: Jun. 24, 2021

(65) Prior Publication Data
US 2022/0412607 A1 Dec. 29, 2022

(30) Foreign Application Priority Data
Dec. 18, 2019 (AT) .............................. A 51109/2019

(51) Int. Cl.
*F24S 23/74* (2018.01)
*F24S 10/70* (2018.01)
*F24S 23/79* (2018.01)
*F24S 30/00* (2018.01)
(Continued)

(52) U.S. Cl.
CPC ............. *F24S 23/745* (2018.05); *F24S 10/74* (2018.05); *F24S 23/79* (2018.05); *F24S 30/452* (2018.05); *F24S 80/30* (2018.05); *F24S 2030/11* (2018.05); *F24S 2030/15* (2018.05)

(58) Field of Classification Search
None
See application file for complete search history.

(56) References Cited

U.S. PATENT DOCUMENTS 4,173,397 A * 11/1979 Simpson ................ F24S 20/20
126/684
4,203,426 A 5/1980 Matlock
(Continued)

FOREIGN PATENT DOCUMENTS

CN 102589154 A 7/2012
CN 103196241 A 7/2013
(Continued)

OTHER PUBLICATIONS

Machine translation CN-107421136-A (Year: 2025).*
(Continued)

*Primary Examiner* — Michael G Hoang
*Assistant Examiner* — Deepak A Deean
(74) *Attorney, Agent, or Firm* — Duane Morris LLP

(57) ABSTRACT

The invention relates to a parabolic trough collector comprising a parabolic, trough-shaped main reflector, preferably as a steel girder construction running holding device with a plurality of support arms for holding of the main reflector, an absorber tube, which extends along the focal line of the Main reflector extends and in which a heat transfer medium is heated, and a foundation, wherein the holding device on the foundation by a vertical axis is rotatably mounted.

24 Claims, 13 Drawing Sheets

(51) Int. Cl.
*F24S 30/452* (2018.01)
*F24S 80/30* (2018.01)

(56) References Cited

U.S. PATENT DOCUMENTS

| | | | | | |
|---|---|---|---|---|---|
| 4,552,438 | A * | 11/1985 | Murphy | F24S 23/81 359/853 |
| 4,883,340 | A * | 11/1989 | Dominguez | G02B 7/183 359/593 |
| 4,934,324 | A * | 6/1990 | Lenz | F24S 30/452 126/714 |
| 5,050,913 | A * | 9/1991 | Lenz | F16L 27/0816 285/332.1 |
| 5,865,905 | A * | 2/1999 | Clemens | H10F 77/488 136/246 |
| 6,994,082 | B2 * | 2/2006 | Hochberg | F24S 25/50 126/696 |
| 2010/0051018 | A1 * | 3/2010 | Ammar | F24S 23/79 126/684 |
| 2010/0206357 | A1 * | 8/2010 | Littau | H02S 20/32 136/246 |
| 2011/0162692 | A1 * | 7/2011 | Giacalone | F24S 23/74 126/576 |
| 2011/0220092 | A1 * | 9/2011 | Ven | F24S 23/79 126/685 |
| 2013/0092154 | A1 * | 4/2013 | Lu | F24S 30/425 126/685 |
| 2014/0318600 | A1 * | 10/2014 | Walsh | F21V 7/0025 136/246 |
| 2017/0138637 | A1 * | 5/2017 | Adel | F24S 30/428 |
| 2017/0370618 | A1 * | 12/2017 | Zhu | G02B 19/0023 |
| 2021/0239364 | A1 * | 8/2021 | Wang | F24S 10/70 |
| 2022/0412607 | A1 * | 12/2022 | Adel | F24S 23/745 |

FOREIGN PATENT DOCUMENTS

| | | | | |
|---|---|---|---|---|
| CN | 107421136 A | * 12/2017 | F24S 30/422 |
| CN | 207180067 U | 4/2018 | |
| EP | 2893268 A1 | 7/2015 | |
| KR | 20110122949 A | 11/2011 | |
| WO | WO 02/097341 A | 12/2002 | |
| WO | WO 2007/109901 A | 10/2007 | |
| WO | WO 2010/004420 A | 1/2010 | |

OTHER PUBLICATIONS

International Searching Authority, “International Search Report” in Application No. PCT/EP2020/082839, dated Nov. 20, 2020, 3 pages.

Austrian Patent Office, “Office Action” in Application No. A 51109/2019, dated Sep. 17, 2020, 3 pages.

* cited by examiner

Detail A

PARABOLIC TROUGH COLLECTOR

This application is a United States national phase entry of PCT International Application No. PCT/EP2020/082839 entitled "PARABOLIC TROUGH COLLECTOR" filed in Europe on Nov. 20, 2020, which claims priority to Austrian Patent Application No. A51109/2019, filed on Dec. 18, 2019.

The invention relates to a parabolic trough collector. A parabolic trough collector comprises a parabolic shaped mirror trough, which concentrates the direct solar radiation to a so called focal line, in which an absorber pipe (a so called receiver) is arranged. A medium is passed through the absorber pipe, which is heated by the focused solar radiation. The higher the concentration on the focal line, the better the energy yield and the efficiency of the collector. A high energy yield can be achieved in particular by a large aperture of the parabolic mirror.

However, when increasing the aperture of a parabolic trough collector, the problem of increased wind loads occurs, which cause the parabolic mirror to move or oscillate and focus deviations to occur. Therefore, the aperture of the parabolic mirror is usually small and a complex holding structure is required to avoid focus deviations under wind loads and to maintain optical precision. Therefore, conventional parabolic trough collectors require an extended installation area and are usually limited in their aperture to about 7.5 m.

In particular from EP 2893268 B1 it is known to provide parabolic trough collectors with a tensioning device, which is designed to tension individual mirror segments, which are arranged on a chain or the like, at a plurality of engagement points with a vertical force downwards. As a result, the mirror segments form a parabolic shape without the need to adjust the entire holding structure of the parabolic mirror.

However, another problem with such parabolic trough collectors is that the wind load increases sharply as soon as the parabolic mirror is rotated about a horizontal axis, for example to follow the rising or setting sun. A horizontal rotation causes the collector to reach a height at which the wind load becomes very strong, causing deformations, so that the size of the collector is limited.

One object of the invention is to solve these and other problems of conventional parabolic trough collectors and to create an improved parabolic trough collector that allows a low wind load with a high energy yield and high aperture.

According to the invention, this is achieved by the features of claim 1.

A parabolic trough collector according to the invention comprises a parabolic, trough-shaped main reflector, a holding device preferably designed as a steel beam structure with a plurality of support arms for holding the main reflector, and an absorber pipe which extends along the focal line of the main reflector and in which a heat transfer medium is heated. The holding device is mounted on a base for rotation about a substantially vertical axis. Thus, according to the invention, the holding device and thus the entire collector are equipped with azimuthal tracking.

This gives the advantage that the parabolic trough collector can approximately follow the position of the sun, i.e. it can follow the sun in a horizontal plane. The azimuthal tracking allows the collector to track the sun in a horizontal plane (horizontal angle) instead of following the sun along its elevation (elevation angle). A swiveling of the collector, which would lead to a strongly increased wind load, is therefore no longer mandatory; already by the rotation a strongly increased energy yield can be achieved compared to conventional collectors. Typical dimensions of a parabolic trough collector according to the invention are apertures in the range of 12 m and above with a diameter of the absorber pipe of about 70 mm.

The base can be any arrangement, which is not necessarily immovable. For example, the base may also be a rail arrangement, on which the holding device can be moved, or it may be a floating platform. The rotatability of the holding device relative to the base is essential.

According to the invention, multiple embodiments are provided to achieve rotatability of the collector about the vertical axis. It may be provided that the holding device comprises at least one, preferably two, particularly preferably three, circular support circles, which are concentric around the vertical axis and which are preferably made of steel beam pipes, in which a plurality of rollers, preferably polyamide rollers, attached to the base engage. The running surfaces of the rollers face upwards so that a contamination of the running surface and the rollers is prevented.

It may also be provided that a plurality of rollers, preferably polyurethane rollers, are arranged on the holding device itself, the rollers being preferably provided with brushes to prevent a contamination. The rollers may contact the base directly. It may also be provided that the rollers engage circular metallic running grooves, which are arranged on the base specifically for this purpose, to achieve a better rotatability of the rollers. Preferably, the rollers are arranged on the holding device point-symmetrically to the vertical axis, for example in a rectangle, a hexagon, or an octagon about the vertical axis. The rollers may also be arranged in multiple shapes inside one another, for example a square and an octagon surrounding the square. In this case, two running grooves arranged in concentric circles around the vertical axis may be provided on the base.

On the holding device, a plurality of photovoltaic elements for generating electrical energy may be arranged. This has the advantage that the photovoltaic elements, such as the collector itself, may track the position of the sun by rotating about the vertical axis.

The generated electrical energy can be used to operate a drive motor to perform the rotation or for other purposes.

The trough-shaped main reflector may extend substantially parallel to the base; however, it may also have a preset inclination which is adapted to the expected position of the sun. The inclination of the longitudinal axis of the main reflector relative to the base may be 5° to 45°, for example.

In order to further increase the energy yield of the parabolic trough collector and to avoid edge or end losses, it may be provided that a plate-shaped end reflector running substantially normal to the longitudinal extent of the main reflector is arranged on a front face of the trough-shaped main reflector. The end reflector extends preferably from the apex of the main reflector to two end regions of the main reflector. Further, the end reflector is preferably designed in such a way that it reflects incoming beams of sunlight on the centrally running absorber pipe. For this purpose, a slight inclination of the end reflector to the vertical or an inclination of individual elements of the end reflector to the vertical may also be provided. The end reflector may comprise a plurality of plate-shaped mirror elements or the like, which are arranged on a substantially vertically running support. Due to the end reflector, beams of sunlight reflected beyond the absorber pipe are reflected back to the main reflector or directly to the absorber pipe at the end of the trough, thus avoiding edge or end losses. Thus, azimuthal tracking using the end reflector results in a larger reflective surface than is formed by the gross aperture area or collector land area, since a portion of the solar radiation falls directly on the end reflector, and is then reflected onto the main reflector and subsequently onto the absorber pipe or a secondary reflector.

The absorber pipe is arranged centrally along the focal line of the parabolic trough collector. It may comprise a tubular supply conduit and a tubular discharge conduit for the heat transfer medium. The supply conduit and the discharge conduit may preferably be guided downwards on the front faces of the main reflector to avoid shadowing of the main reflector.

In order to enable a rotation of the holding device, it may be provided that the supply conduit and the discharge conduit are led to the outside in the area of the vertical axis through an opening of the holding device, preferably into a central recess of the base in the area of the vertical axis. This ensures that the supply conduit and the discharge conduit do not get in the way of rotation of the holding device, in particular the rollers of the holding device running on the base.

In this opening of the holding device, a, preferably centrally arranged, drive motor, such as a stepper motor, may be arranged for rotation of the holding device about the vertical axis. The supply conduit and the discharge conduit may be led through a preferably centrally arranged opening in the drive motor, which preferably has a diameter of more than 400 mm, particularly preferably more than 600 mm, in particular more than 670 mm.

The supply conduit and the discharge conduit may extend upwards or downwards along the vertical axis at least in sections. In order to enable a rotation of the holding device, the supply conduit and the discharge conduit may have a rotating joint in these sections. This allows at least partial rotation of the holding device and the associated supply and discharge conduits about the vertical axis.

However, the supply conduit and the discharge conduit may also be guided above the main reflector and do not necessarily have to be guided through an opening of the holding device. Also in this case, the rotating joints are arranged on the vertical axis, but are above the main reflector. The rotating joints may be arranged centrally in the area between the main reflector and the absorber pipe, or even above the absorber pipe.

Alternatively, it may also be provided that the supply conduit and the discharge conduit are designed as flexible hoses in the area of the opening of the holding device. In this case, it must be ensured that the flexible hoses withstand the high temperatures of the heat transfer medium (more than 400° C.).

According to the invention, a secondary reflector is provided, which extends above the absorber pipe and substantially parallel to it. The secondary reflector according to the invention serves to direct the rays reflected by the main reflector and, optionally, also by the end reflector and passing the absorber pipe by a second (secondary) reflection onto the absorber pipe. This allows for larger apertures while maintaining the same diameter of the absorber pipe, resulting in higher concentrations and less thermal losses. The secondary reflector may be formed as an elongated reflective profile that is polished on its underside, i.e., the reflective side closest to the absorber pipe, to reflect incoming beams of light like a mirror surface.

The reflective profile may be formed as an aluminum profile or stainless steel profile, but it may also include another reflective material such as glass or a reflective coating. The secondary reflector may be attached to the absorber pipe at a predetermined distance. The secondary reflector may extend along the entire length of the absorber pipe.

According to the invention, the secondary reflector is provided with a circular section and two edge lines in its cross-section. This is particularly advantageous if the secondary reflector is formed as a profiled metal sheet, for example an aluminum or stainless steel sheet, which can be bent comparatively easily into the desired shape. In this case, the circular section and the two edge lines preferably have a highly polished and reflective outer surface. Alternatively, this profile shape can be formed by joining strips of glass or another reflective material. While the circular section reflects the beams of light reflected past the absorber pipe directly onto the absorber pipe, the edge lines are designed to reflect further primarily reflected beams of light passing the absorber pipe back onto the main reflector, so that these beams hit the absorber pipe after further reflection. Optionally, the secondary reflector also reflects radiation reflected from the edge of the main reflector back onto the absorber pipe; this is particularly advantageous if the absorber pipe is at the same height as the edge of the main reflector.

According to the invention, the circular section of the secondary reflector can cover an angular range of less than 180°, preferably about 160° to 170°, particularly preferably about 165°. This avoids shadowing of the reflection of the main reflector by the secondary reflector.

According to the invention, it may be provided that the circular section of the secondary reflector is arranged above and eccentric to the longitudinal axis of the absorber pipe. This means that the geometric center of the absorber pipe and the geometric center of the secondary reflector do not coincide.

The center of the secondary reflector is thus preferably well above the center of the absorber pipe, particularly preferably by a distance of at least 10 mm. Thus, the cross-sections of the secondary reflector and of the absorber pipe do not necessarily extend concentrically. In embodiments of the invention, the secondary reflector may also be arranged below the absorber pipe. This may be particularly advantageous if the ends of the main reflector or the end reflector extend beyond the vertical position of the absorber pipe in the vertical direction.

According to the invention, the edge lines of the secondary reflector may extend outwards at an angle of about 10° to the connecting line of the corner points of the circular section. Preferably, the edge lines do not have a radial extension in cross-section, i.e., their extension does not end in the geometric center of the circular section. The edge lines extend more wing-like from the end points of the circular section outwards and slightly upwards.

According to the invention, it may be provided that the diameter of the circular section of the secondary reflector is about three to five times larger than the diameter of the absorber pipe, and the edge lines have a length which corresponds approximately to the diameter of the absorber pipe. For example, the absorber pipe may have a diameter of about 50 mm to 140 mm, preferably about 70 mm.

However, other dimensions and angles are also provided in accordance with the invention. In particular, the shape and exact dimension of the secondary reflector can be adapted to the particular application, especially to the shape of the absorber pipe and the aperture of the main reflector.

The main reflector can be flexible in its shape and can be arranged on or rest on a tensioning element suspended between the support arms of the holding device. The tensioning element may be a rope, cable or chain. In order to force the tensioning element into a parabolic shape even during operation, a plurality of spaced engagement points are provided on the tensioning element. At these engagement points, substantially vertically running pulling means are provided which can be pulled in the direction of the base. The length of the pulling means can be adjustable, in particular by means of turnbuckles or springs. This allows a parabolic shape to be achieved on site, without an assembly hall or additional tools. It is thus possible to react flexibly to wind loads, and the tensioning element can also be easily returned to its parabolic shape in the event of deformation. When the preload is increased, the resistance to deformation also increases.

According to the invention, the main reflector may comprise a plurality of substantially similar mirror plates or polished sheet metal plates, in particular aluminum plates, whose width is preferably in the range of the diameter of the absorber pipe, for example about 70 mm. The plates may have a flat, i.e., non-curved, reflective surface. The width here denotes the extension along the tensioning element. The small width of the plates allows a very precise adaptation of the main reflector to the parabolic shape of the tensioning element. However, the length of the plates can be much greater. A large number of plates can be arranged between two engagement points of the tensioning element, for example 7, 10, or 15 plates.

The main reflector may have a plurality of main reflector modules, wherein each main reflector module comprises a plurality of plates, for example 50, 100, 150 or 200 plates.

The holding device may have a plurality of support arms parallel to each other, with a main reflector module with individual plates attached between each two parallel support arms.

The main reflector may have an entire aperture of more than 7 m, preferably more than 10 m, particularly preferably an aperture in the range of more than 12 m.

According to the invention, it may be provided that the holding device comprises at least one inner support strut, which extends centrally substantially parallel to the focal line of the main reflector, for holding a maintenance device or other devices. In operation, the maintenance device may be supported on the inner support strut.

Preferably, two similar inner support struts are provided, which extend parallel to each other over the entire length of the parabolic trough collector. The support struts are preferably arranged below the absorber pipe, i.e., they are closer to the main reflector than the absorber pipe.

Further, at least one outer support strut may be provided for holding the maintenance device. In particular, an outer support strut, which extends substantially parallel to the focal line of the main reflector, may be provided. A particularly stable support of the maintenance device can be obtained by suspending the latter between the inner support struts and the outer support struts. The outer support strut may be a part of the holding device or may be connected to the holding device via attachment means.

According to the invention, the inner and/or outer support struts may be designed such that the maintenance device is displaceable along the support struts in the longitudinal direction of the parabolic trough collector. The maintenance device may be used for mounting, cleaning and maintenance of the main reflector or individual main reflector modules. This is particularly advantageous in the case of large collectors where the entire reflecting surface may be hard to reach without a maintenance device.

The absorber pipe may comprise a plurality of parts each connected by a flanged joint, the flanged joint comprising two end flanges of each of the parts and a separate adapter piece disposed therebetween. The adapter piece and the specially designed end flanges enable a modular construction of the absorber pipe on site, even in case of very long collectors. The adapter piece may comprise an opening for the passage of the heat transfer medium and multiple, preferably four, segment-shaped elongated holes arranged around the opening for flexibly connecting the end flanges to each other. During assembly, the adapter piece is arranged between the end flanges and screwed to them. For adaptation to end flanges that may be slightly twisted relative to each other, the elongated holes preferably each extend over an angular range of about 60° to about 75°. This ensures that the parts of the absorber pipe can be screwed together even if they are slightly twisted relative to each other.

For holding the extended absorber pipe, it may further be provided that at least one of the adapter pieces is connected to an absorber pipe holder, for example screwed or connected with bolts. It is also possible for each of the adapter pieces to be connected to an absorber pipe holder. This allows for a simple and modular assembly of the absorber pipe on site.

The absorber pipe holder may be in the form of a vertical support strut that includes a mounting plate on the front face. The mounting plate can have elongated holes in which bolts for connection to the adapter pieces are movably guided along the longitudinal axis of the absorber pipe. This has the advantage that the absorber pipe can expand axially thermally without damaging the structure. Thus, in this case, the absorber pipe is supported by the absorber pipe holders, but remains easily movable axially along the elongated holes in the mounting plate.

According to the invention, it may be provided that the main reflector comprises a plurality of flexible main reflector modules lined up along the focal line. Such a main reflector module may be in the form of several flexibly attached mirror plates or polished metal plates, in particular aluminum plates or the like. However, the main reflector modules may also be designed as a preferably one-piece, flexible mirror foil. The length of the main reflector modules may correspond to half the aperture of the main reflector, if two main reflector modules each extend from the focal line to the support arms of the end regions. The width of the main reflector modules, i.e., their extension along the focal line, may be about 1.65 m. The width of the mirror plates or metal plates may be approximately in the range of the diameter of the absorber pipe, in particular about 70 mm.

Preferably, the weight distribution of the main reflector modules in the aperture direction (x-direction, normal to the focal line of the main reflector), may be chosen such that the main reflector modules, when freely suspended between the support arms of the holding device, assume a parabolic shape due to their weight. In other words, the weight distribution is chosen such that the weight of the main reflector modules per unit length in the x-direction is exactly the same when the main reflector modules assume a parabolic shape. In this case, the tensioning element described above is unnecessary, since the main reflector already assumes a parabolic shape due to its own weight. The pulling means described above are also not absolutely necessary, but can still be used to fix the mirror arrangement.

In particular, it may be provided that the width $b(x)$ of the main reflector modules is not constant along the aperture (x-direction), but decreases from the focal line to the support arms. In particular, the width of the main reflector modules may follow the following approximation formula:

$$b(x) = \frac{b(0) \cdot s(0.001)}{s(x + 0.001) - s(x)}$$

The value of b(0) denotes the width of the main reflector module in the focal line. The function s(x) denotes the arc length and is calculated for the parabola $$f(x) = \frac{x^2}{12}$$

according to the following formula:

$$s(x) = \frac{1}{12} \cdot \sqrt{x^2 + 36} \cdot x + 3 \cdot \sinh^{-1}\left(\frac{x}{6}\right)$$

The variable x extends from the focal line of the main reflector (x=0) to half the aperture of the main reflector, for example x=6 m for a main reflector with 12 m aperture.

This ensures that the main reflector modules are heaviest in the area of the focal line and lightest in the area of the support arms. Consequently, the desired parabolic shape of the main reflector is achieved by the weight distribution alone. In this embodiment, the main reflector modules abut against each other in the area of the focal line, but form gaps in the area of the support arms, since they are narrower there.

According to the invention, however, separate compensating elements may also be provided, in particular on the underside of the main reflector modules, in order to achieve the desired weight distribution. The width of the compensating elements may not be constant along the aperture, but may decrease from the focal line to the support arms, so that the compensating elements are heavier in the area of the focal line than in the area of the support arms. In this exemplary embodiment, the main reflector modules are thus of constant width, so that no gaps are created; the desired weight distribution to achieve the parabolic shape results from the compensating elements with different widths and weights on the underside of the main reflector modules.

The compensating elements may be made of steel, in particular a steel sheet, for example. The compensating elements may be individual plates made of steel sheet, but they may also be a continuous steel sheet.

In particular, it may be provided that the width b(x) of the compensating elements decreases in the aperture-direction (x-direction) from the focal line to the support arms. The width of the compensating elements may follow the following approximation formula:

$$b(x) = \frac{b(0) \cdot s(0.001) \cdot (\rho_s s_s + \rho_G s_G) - b(0) \cdot (s(x + 0.001) - s(x)) \cdot \rho_G s_G}{(s(x + 0.001) - s(x))\rho_s s_s}$$

The value of b(0) denotes the width of the compensating element in the focal line. The constant $\rho_s$ is the density of the compensating element, about 7850 kg/m$^3$ in the case of steel; $\rho_G$ is the density of the mirror plate, about 2500 kg/m$^3$ in the case of glass; $s_s$ is the thickness of the compensating element, about 1 mm, and $s_G$ is the thickness of the mirror plate, about 4 mm. The function s(x) denotes the arc length and is calculated according to the formula described above.

According to the invention, it may further be provided that the parabolic trough collector has an angle of inclination towards the south or north, depending on whether it is built-up in the southern hemisphere or in the northern hemisphere.

Further features according to the invention emerge from the patent claims, the description of the exemplary embodiments and the figures. In the following, the invention is explained in more detail on the basis of a non-exclusive exemplary embodiment.

Figure 6A:
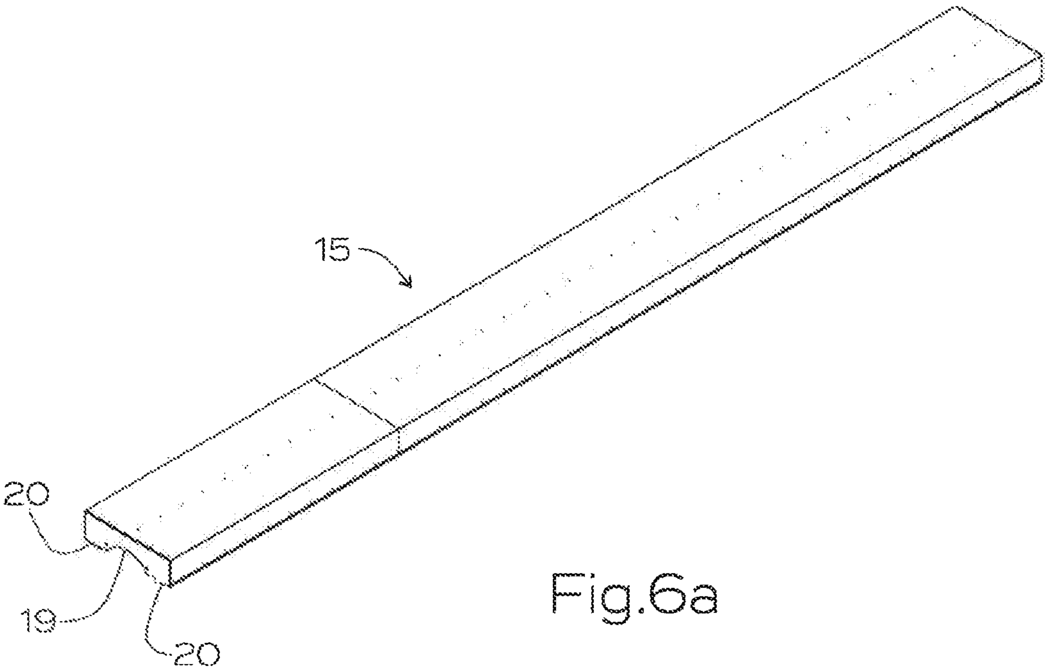
Figure 6B:
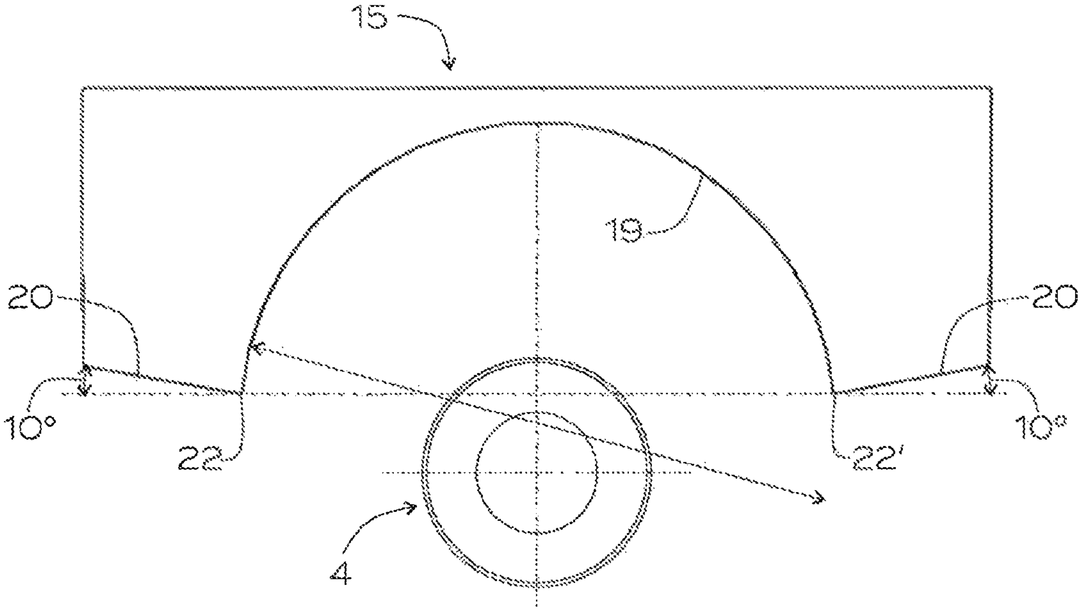
Figure 7A:
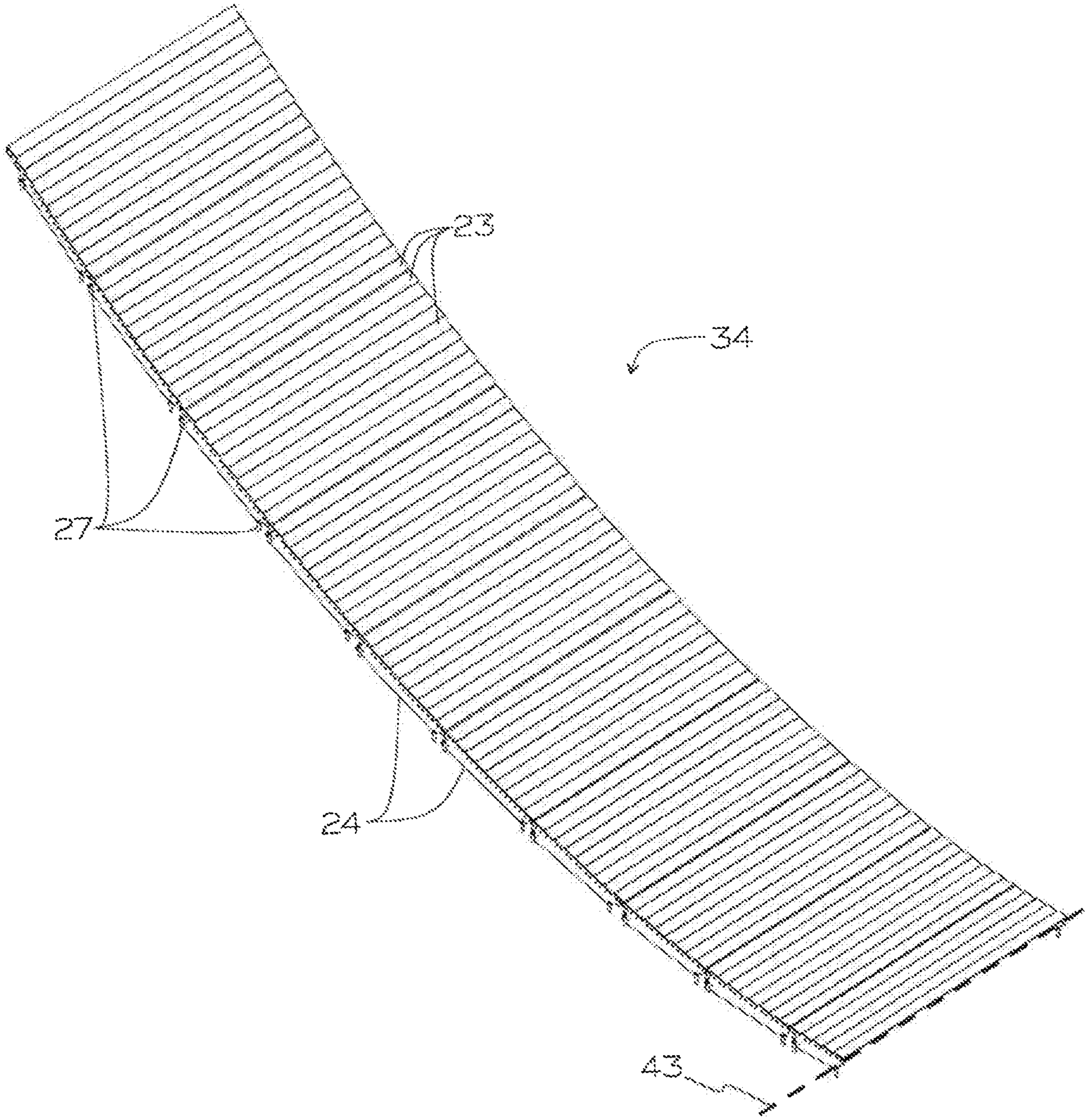
Figure 7B:
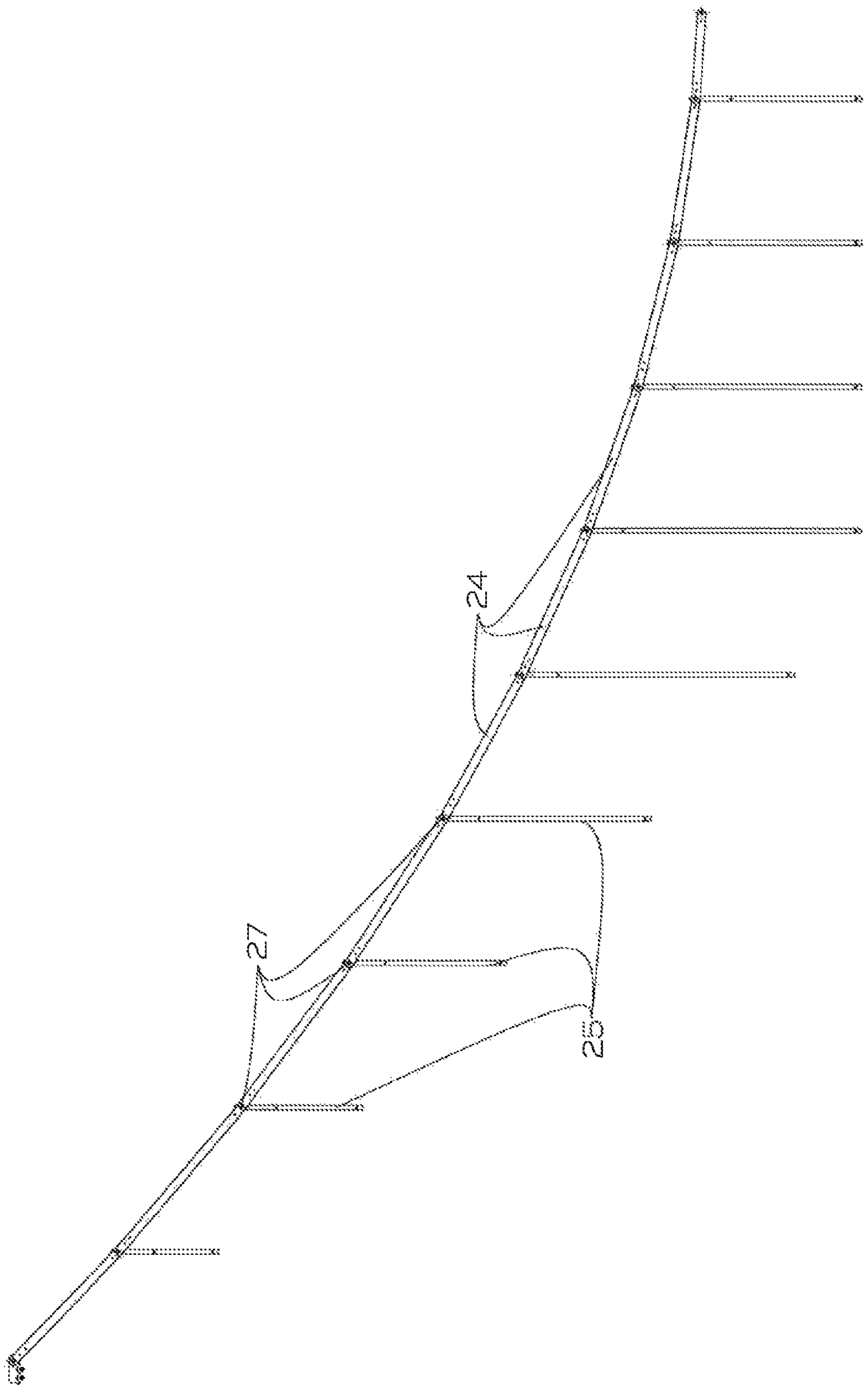
Figure 8:
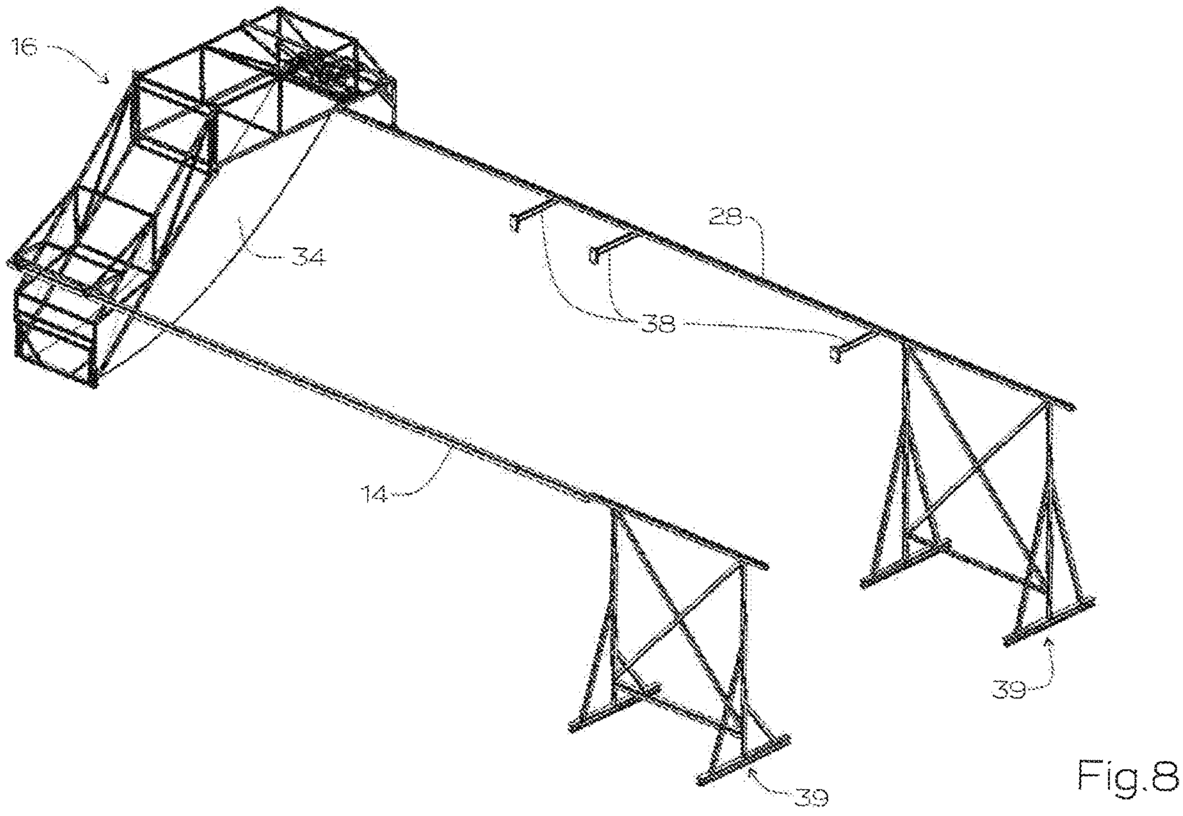
Figure 10A:
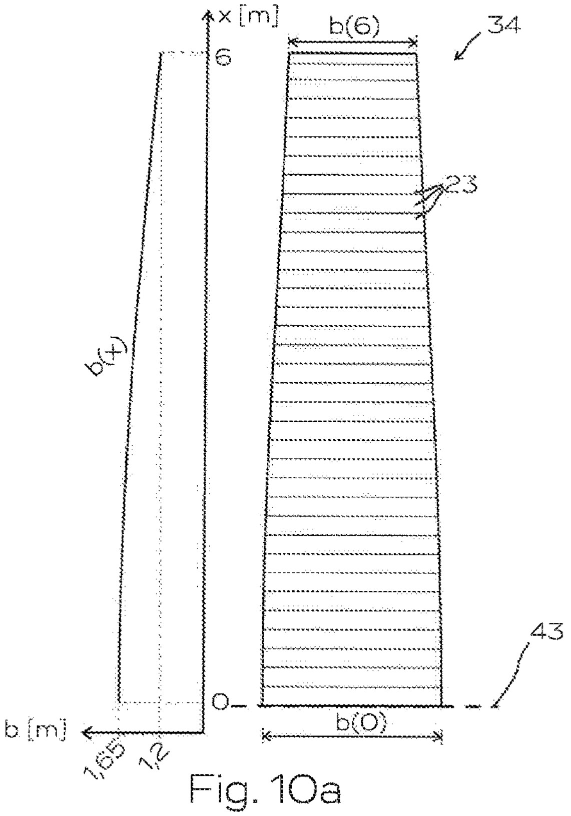
Figure 10B:
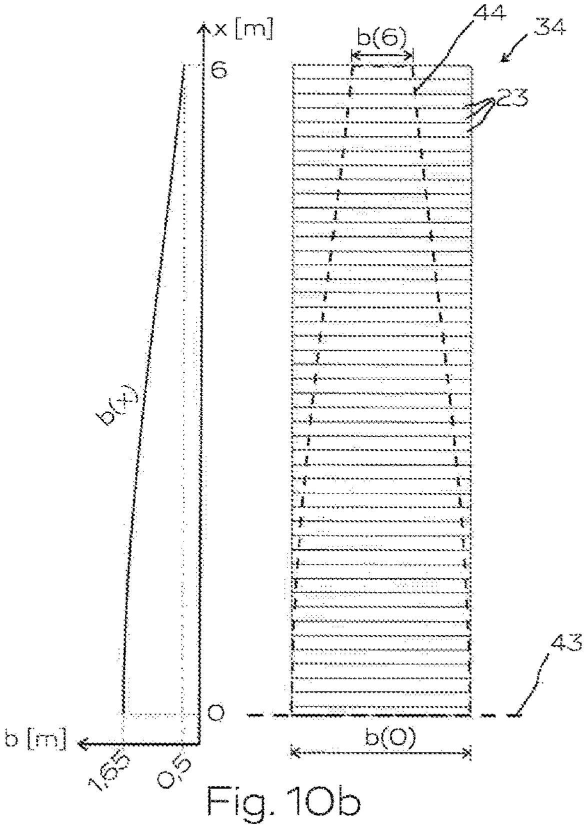

FIGS. 6*a*-6*b* show a schematic three-dimensional representation and a cross-section, respectively, of the secondary reflector of an embodiment of a parabolic trough collector according to the invention;

FIGS. 7*a*-7*b* show a schematic three-dimensional representation and a side view, respectively, of a main reflector module of an embodiment of a parabolic trough collector according to the invention;

FIG. 8 shows a schematic three-dimensional view of a maintenance device on an embodiment of a parabolic trough collector according to the invention;

FIGS. 9*a*-9*e* show a schematic three-dimensional view of the absorber pipe and further views of a flanged joint on an embodiment of a parabolic trough collector according to the invention;

FIGS. 10*a*-10*b* show a schematic view of the main reflector module of a parabolic trough collector according to the invention.

Figure 1:
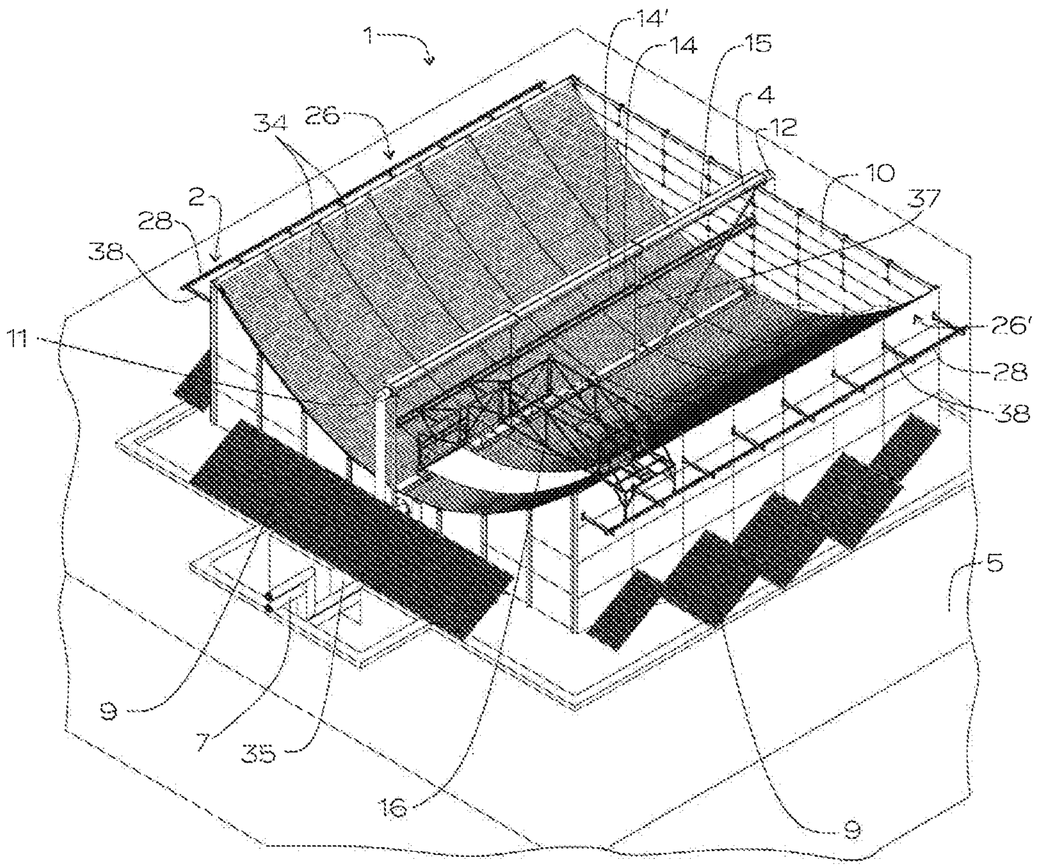
FIG. 1 shows a schematic three-dimensional representation of an exemplary embodiment of a parabolic trough collector according to the invention.

FIG. 1 shows a schematic three-dimensional representation of an exemplary embodiment of a parabolic trough collector according to the invention as a whole. The parabolic trough collector comprises a parabolic, trough-shaped main reflector 1, which is composed of multiple adjacently arranged main reflector modules 34. The main reflector 1 is arranged on a holding device 2 designed as a steel beam structure, which comprises a plurality of support arms 3, 3' for holding the main reflector. An absorber pipe 4 extends along the focal line of the main reflector 1, which in the drawing is largely covered by a secondary reflector 15 arranged above. A heat transfer medium is pumped through the absorber pipe 4, which heats up to temperatures above 400° C. during operation due to the reflected beams of sunlight.

Furthermore, a base 5 is shown on which the holding device 2 is rotatably mounted about a vertical axis 6 (not shown). A support circle 7 is schematically visible under the holding device 2. A supply conduit 11 and a discharge conduit 12 are guided through a base recess 35 without getting in the way of the rotary movement of the holding device 2. Photovoltaic elements 9 for generating electrical energy are also arranged on the holding device.

This schematic representation also includes a maintenance device 16, which is arranged with two cantilevers on an inner support strut 14 and an outer support strut 28 and carries a main reflector module 34 that is not mounted.

A plate-shaped end reflector 10 extending substantially normal to the longitudinal extent of the main reflector 1 is arranged at one front face of the trough-shaped main reflector 1. The end reflector 10 extends from the apex of the main reflector 1 to both end regions 26, 26' of the main reflector 1.

The end reflector 10 comprises a plurality of substantially similar mirror plates arranged adjacent to each other on a substantially vertical support structure.

Figure 2:
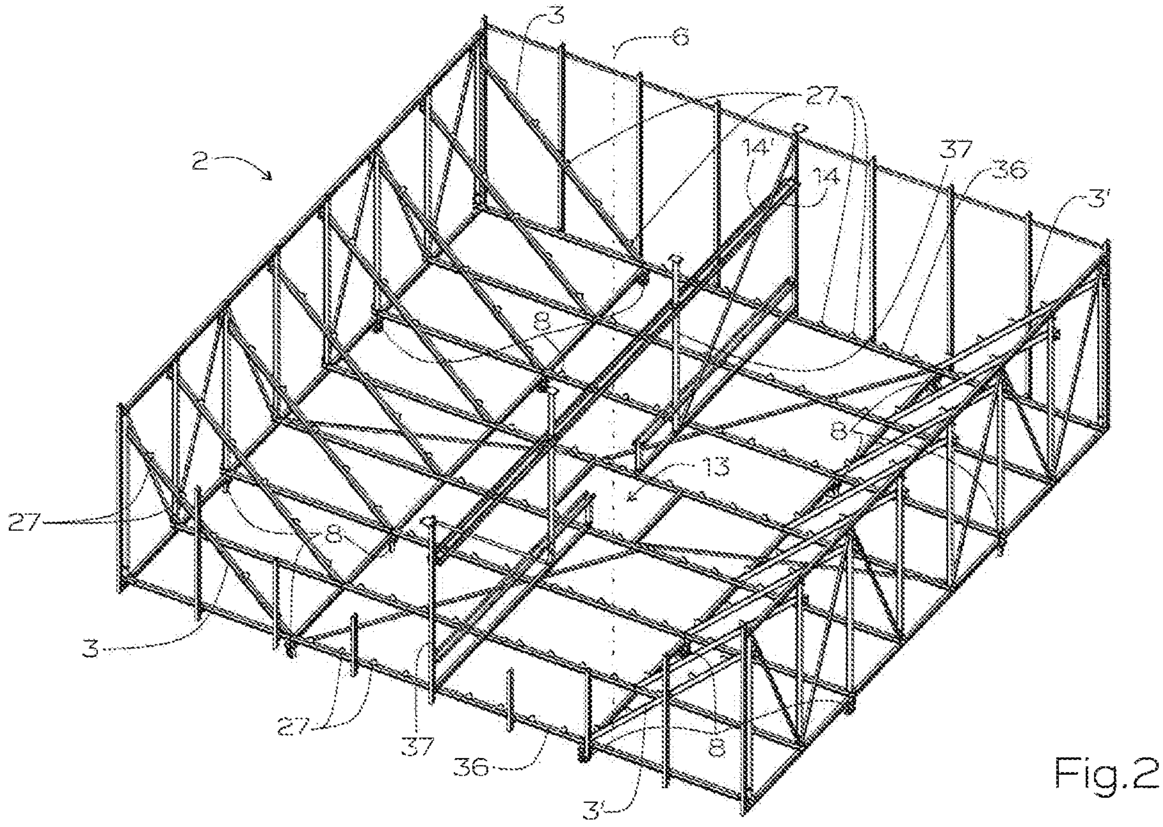
FIG. 2 shows a schematic three-dimensional representation of a holding device of an embodiment of a parabolic trough collector according to the invention.

FIG. 2 shows a schematic representation of a holding device 2 of an embodiment of a parabolic trough collector according to the invention. The holding device 2 is designed as a steel beam structure and comprises eight symmetrically arranged support arms 3, 3' for holding the main reflector 1, which is not shown. On the eight support arms 3, 3' and the eight base struts 36 of the steel beam construction, engagement points 27 in the form of lugs are provided, which are used for mounting tensioning elements 24 (not shown).

On the underside of the base struts 36 are rollers 8, which in this embodiment are designed as polyurethane rollers. The rollers 8 are arranged in two geometric shapes around a central opening 13 and vertical axis 6 of the holding device 2, namely an outer octagon and an inner square. This provides a particularly stable support of the holding device 2 on the base 5.

Figure 3:
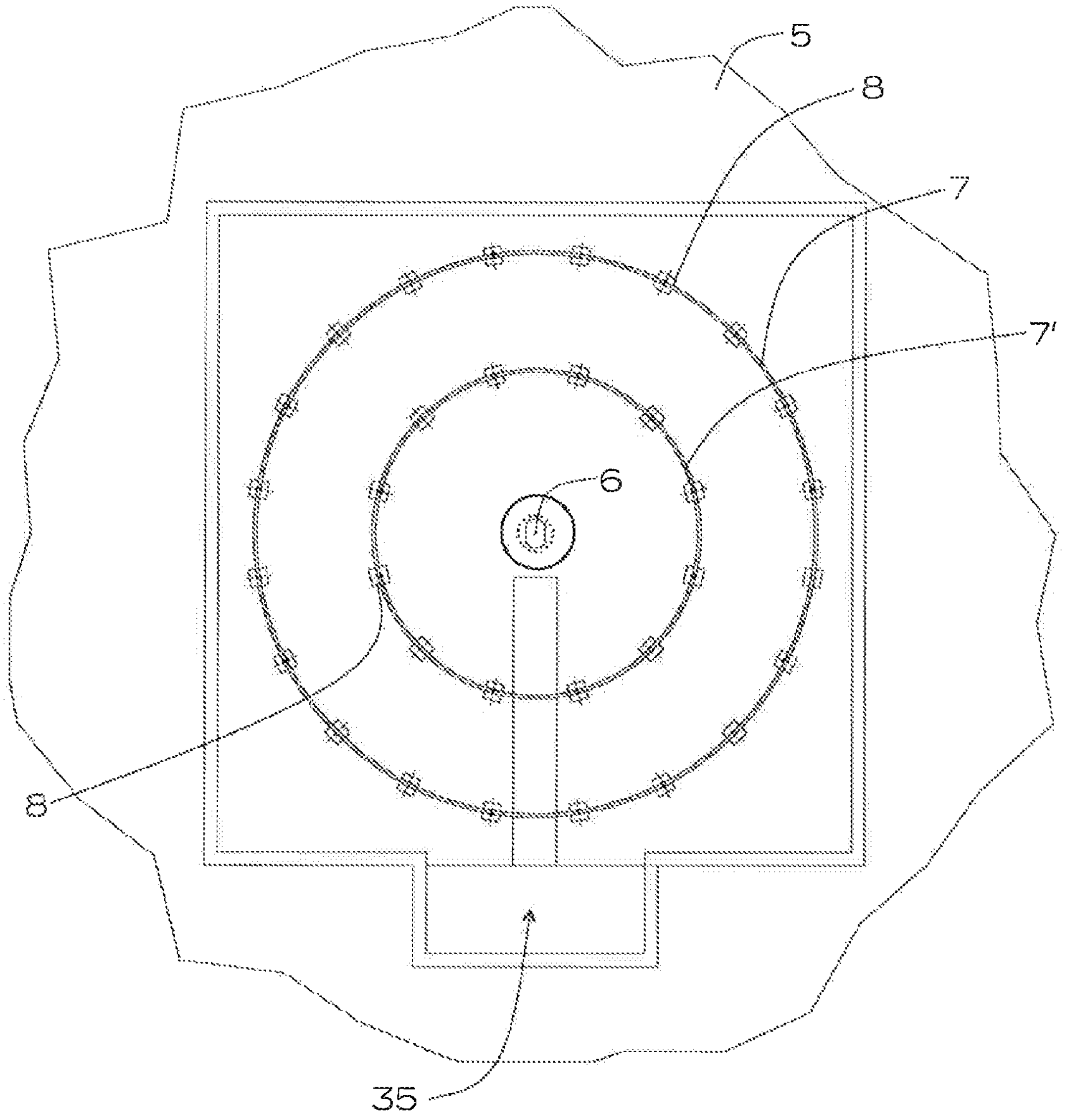
FIG. 3 shows a top view of the base of another embodiment of a parabolic trough collector according to the invention.

FIG. 3 shows a schematic top view of the base 5 of a further embodiment of a parabolic trough collector according to the invention. In this embodiment, the holding device is not provided with rollers, but with the schematically indicated support circles 7, 7', which extend concentrically about the vertical axis 6. On the base 5, rollers 8 are mounted, which are directed upwards and on which the support circles 7, 7' and the holding device 2 itself are rotatably mounted. In this exemplary embodiment, the rollers 8 are designed as polyamide rollers.

The supply conduit 11 and the discharge conduit 12 (not shown) are guided to the outside via a base recess 35.

Figure 4:
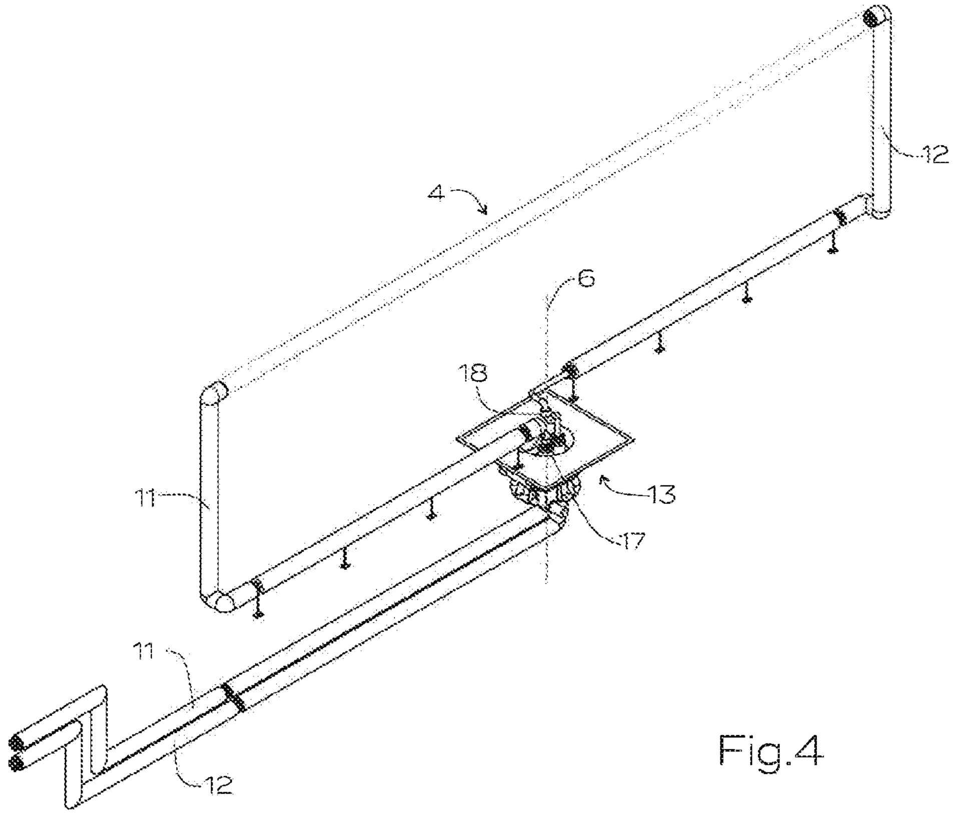
FIG. 4 shows a schematic three-dimensional view of the supply and discharge conduit arrangement of an embodiment of a parabolic trough collector according to the invention.

FIG. 4 shows a schematic three-dimensional view of the supply and discharge conduit arrangement of an embodiment of a parabolic trough collector according to the invention. The supply conduit 11 and the discharge conduit 12 of the heat transfer medium as well as the opening 13 in the area of the vertical axis 6 of the holding device 2 are shown.

The location of the absorber pipe 4 is schematically indicated. In operation, the area above the opening 13, i.e., the absorber pipe 4 and the connected conduits, rotates about the vertical axis 6, while the area below the opening 13, i.e., the two parallel supply and discharge conduits 12, 13, stand still. In this exemplary embodiment, the opening 13 has a dimension of about 600 mm to 800 mm.

Figure 5:
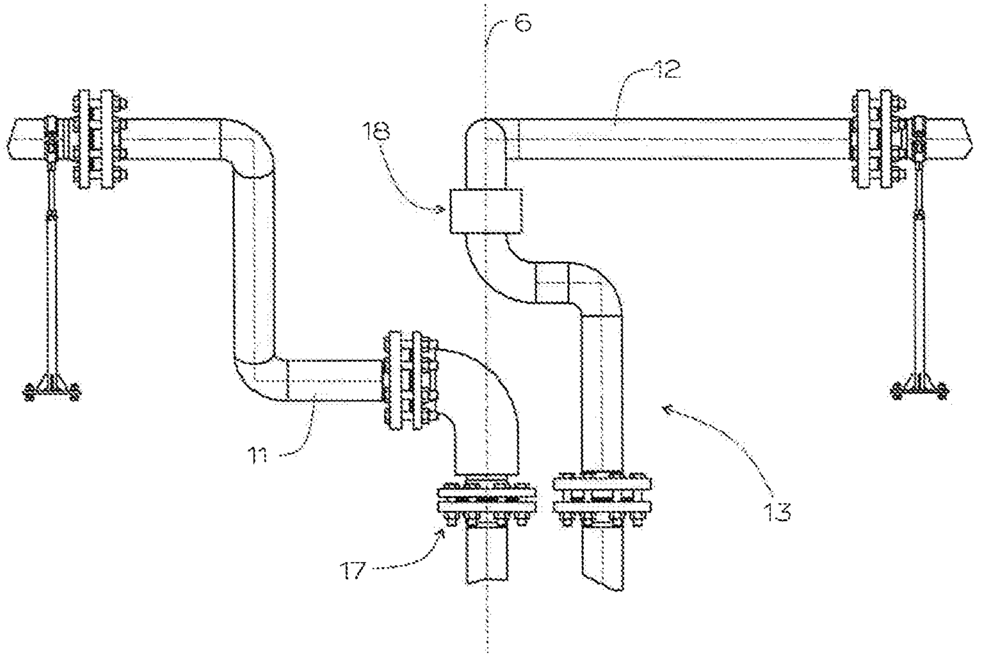
FIG. 5 shows a schematic side view of the supply and discharge conduit arrangement of an embodiment of a parabolic trough collector according to the invention.

FIG. 5 shows a schematic side view of the supply conduit and the discharge conduit of the heat transfer medium in the area of the opening 13, also showing the vertical axis 6 about which the holding device 2 rotates relative to the base 5. The tubular supply conduit 11 and the tubular discharge conduit 12 each run in short sections in the vertical axis 6. Rotating joints 17, 18 are provided in these sections to enable rotation of the holding device 2 and the associated supply conduit 11 and discharge conduit 12 about the vertical axis 6.

FIGS. 6*a*-6*b* show a schematic three-dimensional representation and a cross-section, respectively, of the secondary reflector 15 of an embodiment of a parabolic trough collector according to the invention. The secondary reflector 15 designed as elongated profiled aluminum sheet with a high polish finish at least on the underside.

In other exemplary embodiments, the secondary reflector 15 may comprise other reflective materials. The secondary reflector 15 is arranged above the absorber pipe, as shown in FIG. 1, to direct incorrectly reflected beams of light onto the absorber pipe in a second or third reflection.

The profile of the secondary reflector 15 is shown in detail in FIG. 6*b*, where the position of the absorber pipe 4 is also schematically indicated. In cross-section transverse to its longitudinal extent, the secondary reflector 15 has a circular section 19 and two edge lines 20. The circular section 19 covers an angular range of less than 180°, namely about 165°. The end points 22, 22' of the circular section 19 are schematically indicated.

Relative to the absorber pipe 4, the circular section 19 of the secondary reflector 15 is arranged above and eccentric to the longitudinal axis 21 of the absorber pipe 4. Thus, in this exemplary embodiment, the circular section 19 is not exactly concentric with the absorber pipe 4, but has a geometric center that is spaced slightly above the geometric center of the absorber pipe 4.

From the end points 22, 22' of the circle section 19, the edge lines 20 extend outward at an angle of about 10° to the connecting line of the corner points 22, 22'. Thus, the edge lines 20 do not run radially outward, i.e., their geometric extension meets neither the geometric center of the circular section 19, nor that of the absorber pipe 4. This design of the secondary reflector 15 has proved to be particularly efficient.

The diameter of the circular section 19 is about 3.5 times the diameter of the absorber pipe 4, and the edge lines 20 have a length from the end points 22, 22' which corresponds approximately to the diameter of the absorber pipe 4. In the specific exemplary embodiment, the absorber pipe 4 has a diameter of about 70 mm.

FIGS. 7*a*-7*b* show a schematic three-dimensional representation and a side view, respectively, of a main reflector module 34 of an embodiment of a parabolic trough collector according to the invention.

The main reflector 1 is formed by lining up a plurality of those main reflector modules 34. Each main reflector module 34 comprises a plurality of substantially similar mirror plates 23, the width of which is in the range of about 70 mm.

The length of the mirror plates here is in the range of 100 cm; the entire aperture of the main reflector 1, i.e., the direct distance of the end regions 26, 26' of the main reflector 1, is in the range of about 12 m in this exemplary embodiment.

The mirror plates 23 are flat, i.e., not curved, and are arranged on a tensioning element 24 in the form of a flexible chain. This makes the main reflector 1 flexible in its shape. On the tensioning element 24, engagement points 27 are arranged at regular intervals, which correspond to the engagement points on the support arms 3, 3' and the base struts 36, respectively. In order to force the main reflector 1 into a parabolic shape, pulling means 25 in the form of struts are arranged on the engagement points 27 of the tensioning element 24, the struts being able to be tensioned or pulled towards the base 5.

In order to mount or dismount or clean the individual main reflector modules 34 on the holding device 2, in this exemplary embodiment of a parabolic trough collector according to the invention, inner and outer support struts for a maintenance device 16 are provided.

FIG. 8 shows a schematic three-dimensional view of a maintenance device 16, which is suspended between inner support struts 14 and outer support struts 28. In this exemplary embodiment, the inner support struts 14 are part of the (not shown) holding device 2; the outer support struts 28 are attached to the holding device 2 via cantilevers 38. The maintenance device 16 may be displaced along the inner and outer support struts and carries a main reflector module 34. Further, this figure shows an elevation 39, which serves to push the maintenance device onto the support struts and to remove it from the support struts, respectively, to avoid shadow losses.

Figure 9A:
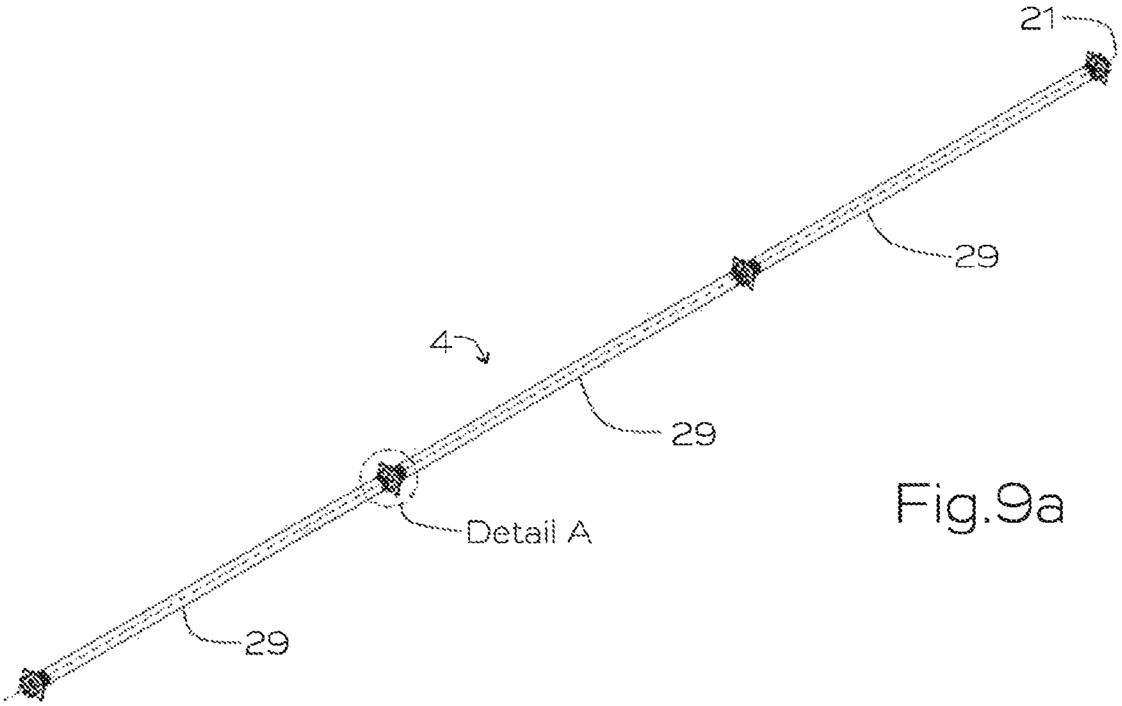

FIG. 9*a* shows a schematic three-dimensional view of the absorber pipe 4. The absorber pipe 4 is divided into a plurality of parts 29, each of them being connected by a flanged joint, the flanged joint comprising two end flanges 30 and an adapter piece 31 disposed therebetween.

Figure 9B:
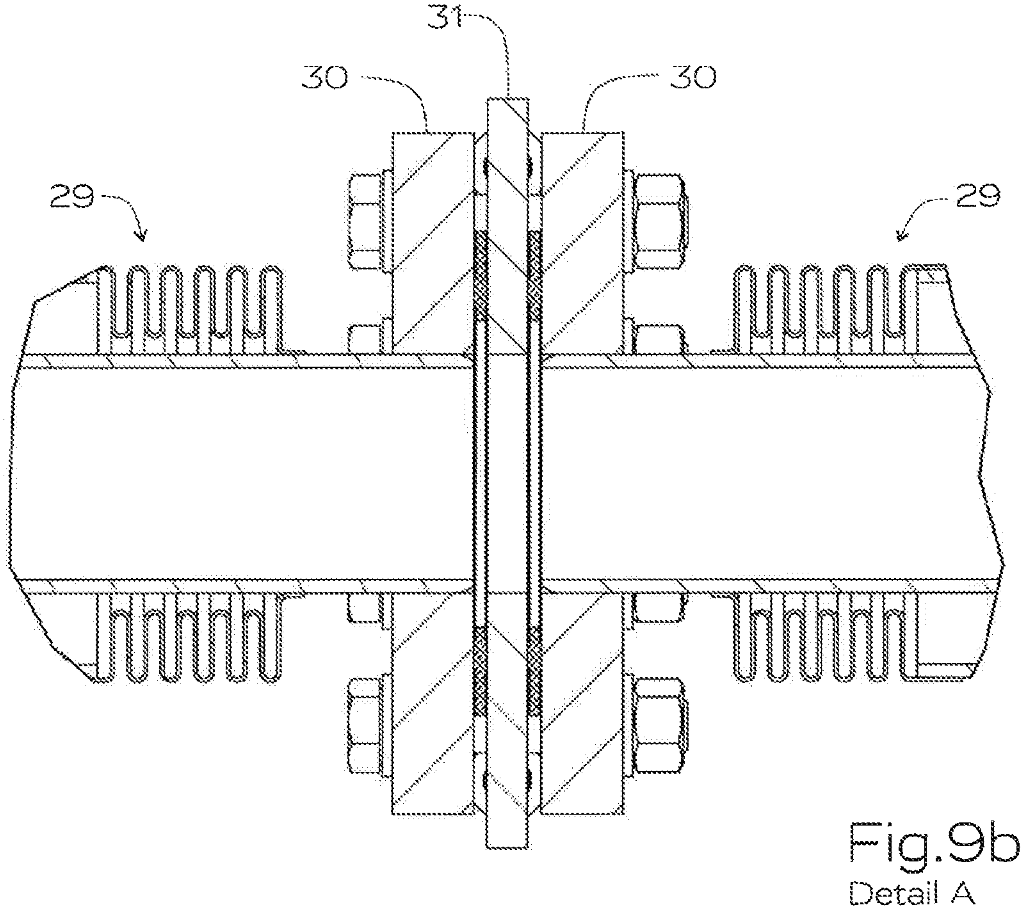

FIG. 9*b* shows the detail A, which is indicated in FIG. 9*a*, in a sectional view. The two parts 29 of the absorber pipe 4 have frontal end flanges 30, which are screwed together via an adapter piece 31 disposed therebetween.

Figure 9C:
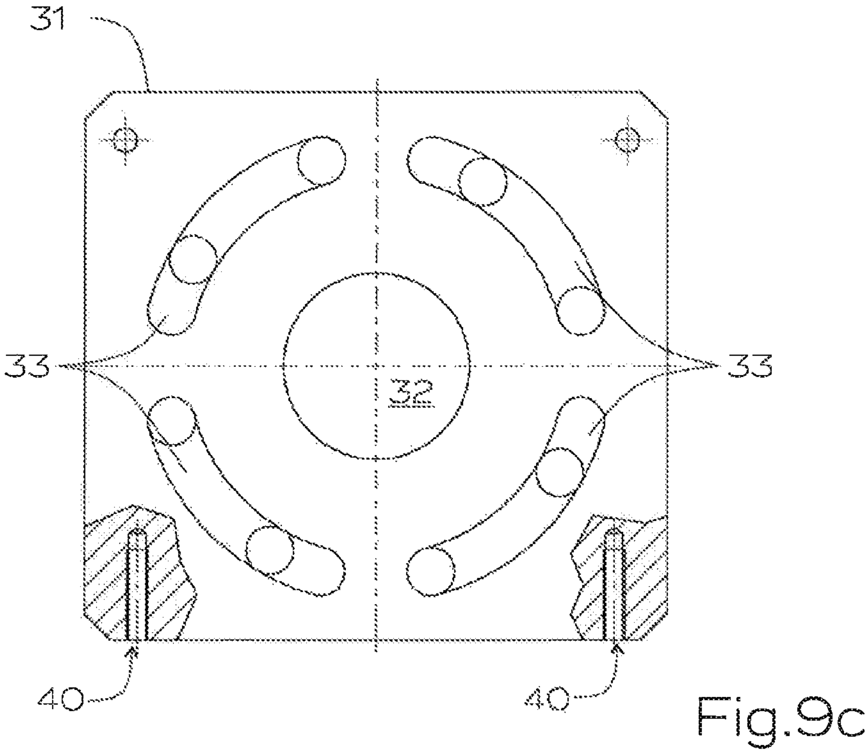
Figure 9D:
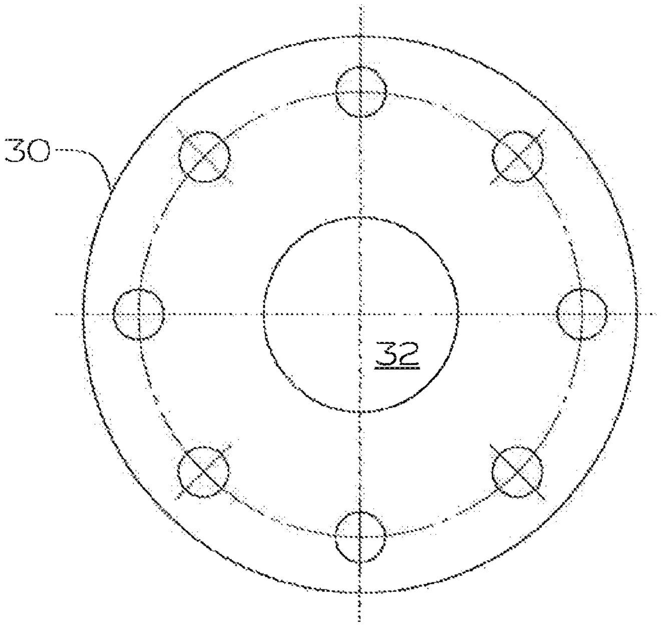

The adapter piece 31 ensures that the end flanges 30 can be tightly connected even if there is a slight play or inaccuracies in the assembly. Furthermore, the adapter piece 31 comprises connecting means 40, which are in flexible connection with an absorber pipe holder 37. FIGS. 9*c*-9*d* show a schematic plan view of the adapter piece 31 and the end flange 30. The adapter piece 31 has an opening 32 for the passage of the heat transfer medium and four segment-shaped elongated holes 33 arranged around the opening 32 for flexibly connecting the end flanges 30. The opening 32 of the end flange 30 carrying the medium is aligned with the opening 32 of the adapter piece 31 arranged therebetween. The end flange 30 comprises eight circularly arranged bores, which are arranged in such a way that they are substantially covered by the elongated holes 33 of the adapter piece 31. Thus, even if the end flanges 30 are twisted relative to each other, a firm connection can be established. The elongated holes 33 extend over an angular range of about 75° each. Further, the adapter piece 31 has connecting means 40 in the form of bores for receiving pins or bolts.

Figure 9E:
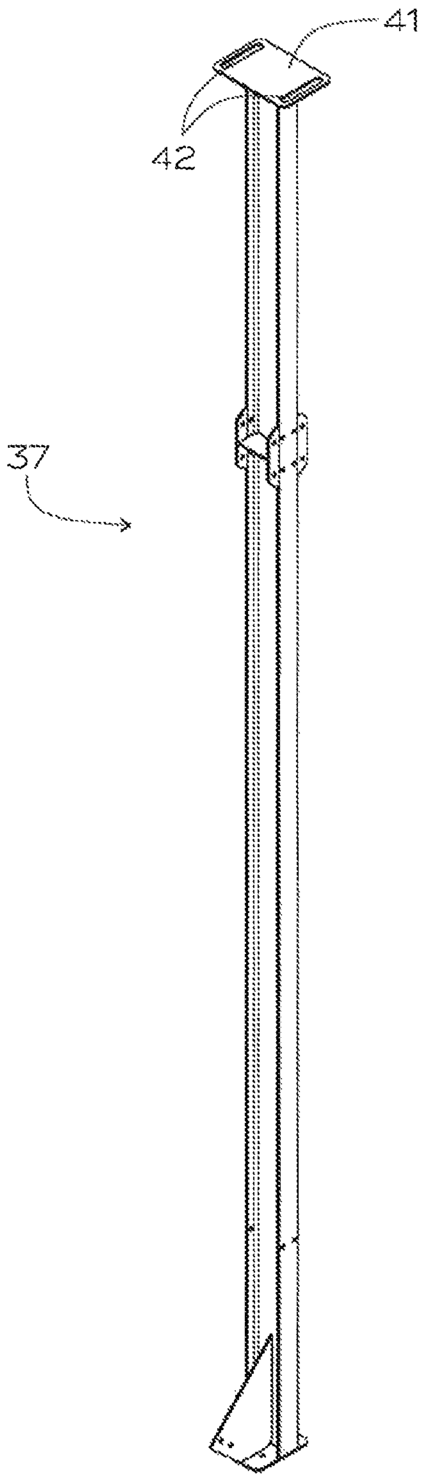

FIG. 9*e* shows a schematic three-dimensional view of the absorber pipe holder 37. The latter is designed as a vertical support strut and has a frontal mounting plate 41. On the mounting plate 41, there are elongated holes 42 which run in the direction of the absorber pipe 4. When assembling the absorber pipe 4, the adapter pieces 31 can be mounted on the mounting plate 41 via the connecting means 40. In doing so, the adapter pieces 31 remain movable relative to the mounting plate 41 in the axial direction of the absorber pipe 4, for example by inserting bolts or pins into the elongated holes 42 and the connecting means 40. Thus, the absorber pipe holders 37 support the load of the absorber pipe 4, but at the same time allow axial movement of the absorber pipe 4 by thermal expansion during operation.

FIG. 10*a* shows a schematic top view of a main reflector module 34 of a parabolic trough collector according to the invention. The main reflector module 34 extends in the aperture direction (x-direction) from the schematically shown focal line 34 (x=0) of the parabolic trough collector outward to the support arms (not shown). A second main reflector module 34, which is not shown, extends outward in the opposite direction. In this exemplary embodiment, the aperture of the main reflector 1 is about 12 m so that the illustrated main reflector module 34 has a length of about 6 m. In this design, the main reflector module 34 is formed by a series of flexibly arranged mirror plates 23 of equal thickness. The extension of the mirror plates 23 in the x-direction is about 70 mm in each case.

The mirror plates 23 are of equal width but not equal length, but taper outwardly from the focal line 34. As a result, the width b(x) of the main reflector module 34 is not constant along the aperture, but decreases continuously from the focal line 43 to the support arms 3, 3'. The width b(x) is schematically shown in the left diagram of FIG. 10*a*. In the area of the focal line, the main reflector module 34 has a width of about 1.65 m. In the area of the support arms, the main reflector module 34 has a width of about 1.2 m. When the main reflector modules 34 are suspended freely between the support arms 3, 3', they assume a parabolic shape due to their variable weight distribution. In the area of the support arms 3, 3', in this embodiment, gaps are formed between the main reflector modules 34.

FIG. 10*b* shows a schematic top view of a main reflector module 34 of a parabolic trough collector according to the invention. As in the exemplary embodiment of FIG. 10*a*, the main reflector module 34 extends in the aperture direction (x-direction) from the schematically shown focal line 34 (x=0) of the parabolic trough collector outward to the support arms 3, 3' (not shown). In this design, the main reflector module 34 is formed by a series of flexibly arranged mirror plates 23 of equal thickness. The extension of the mirror plates 23 in the x-direction is about 70 mm in each case.

In this embodiment, the mirror plates 23 are of the same length, so that in particular in the area of the support arms 3, 3', no gap is formed. To achieve the desired parabolic shape of the main reflector modules 34, specially cut compensating elements 44 made of steel sheet are arranged on the underside of the main reflector modules 34. The width of the compensating elements 44 is not constant along the aperture, but decreases continuously from the focal line 43 to the support arms 3, 3'. The width b(x) of the compensating elements 44 is schematically shown in the left diagram of FIG. 10*b*. In the area of the focal line, the compensating elements 44 have a width of about 1.65 m. In the area of the support arms 3, 3', the compensating elements 44 have a width of about 0.5 m. When the main reflector modules 34 are suspended freely between the support arms 3, 3', they assume a parabolic shape due to the weight distribution of the compensating elements 44.

The exemplary embodiments according to FIG. 10*a* and FIG. 10*b* are based on the materials glass and glass and steel sheet, respectively, where the density of the steel sheet is about 7850 kg/$m^3$, the density of glass is about 2500 kg/$m^3$, the thickness of the steel sheet is about 1 mm, and the thickness of glass is about 4 mm.

The invention is not limited to the described exemplary embodiments, but rather comprises all parabolic trough collectors in the scope of the following patent claims.

LIST OF REFERENCE SIGNS

1 Main reflector
2 Holding device
3, 3' Support arm
4 Absorber pipe
5 Base
6 Vertical axis
7, 7' Support circle
8 Roller
9 Photovoltaic element
10 End reflector
11 Supply conduit

12 Discharge conduit
13 Opening
14, 14' Inner support strut
15 Secondary reflector
16 Maintenance device
17 First rotating joint
18 Second rotating joint
19 Circular section
20 Edge line
21 Longitudinal axis
22, 22' Corner point of the circular section
23 Mirror plate
24 Tensioning element
25 Pulling means
26, 26' End region of the main reflector
27 Engagement point
28 Outer support strut
29 Part of the absorber pipe
30 End flange
31 Adapter piece
32 Opening
33 Elongated hole
34 Main reflector module
35 Base recess
36 Base strut
37 Absorber pipe holder
38 Cantilever
39 Elevation
40 Connecting means
41 Mounting plate
42 Elongated hole
43 Focal line
44 Compensating element

The invention claimed is:

1. A parabolic trough collector, comprising a parabolic, trough-shaped main reflector, a holding device, with a plurality of support arms for holding the main reflector, an absorber pipe, which extends along the focal line of the main reflector and in which a heat transfer medium is heated, and a base, wherein the holding device is mounted on the base so as to be rotatable about a vertical axis, wherein a secondary reflector is provided, which extends substantially parallel to and above or below the absorber pipe and which is formed by an elongated reflective profile, wherein the secondary reflector has in its cross-section a circular section and two edge lines, wherein the main reflector comprises a plurality of flexible main reflector modules aligned along the focal line, wherein the weight distribution of the main reflector modules along an aperture of the main reflector is such that, when freely suspended between the support arms of the holding device, the main reflector modules assume a parabolic shape due to the weight distribution, and wherein compensating elements are arranged on the underside of the main reflector modules, the width of the compensating elements not being constant along the aperture, but decreasing from the focal line to the support arms.

2. The parabolic trough collector according to claim 1, wherein the holding device comprises at least one, circular support circle extending concentrically around the vertical axis in which a plurality of rollers attached to the base engage.

3. The parabolic trough collector according to claim 1, wherein a plurality of rollers are arranged on the holding device in a rectangle, a hexagon, or an octagon.

4. The parabolic trough collector according to claim 1, wherein a plurality of photovoltaic elements are arranged on the holding device for generating electrical energy.

5. The parabolic trough collector according to claim 1, wherein a plate-shaped end reflector extending substantially normal to the longitudinal extent of the main reflector is arranged at one end face of the trough-shaped main reflector and extends from the apex to two end regions of the main reflector.

6. The parabolic trough collector according to claim 1, wherein the absorber pipe comprises a tubular supply conduit and a tubular discharge conduit for the heat transfer medium, both of them running through an opening of the holding device in the area of the vertical axis or extending in the area above the main reflector.

7. The parabolic trough collector according to claim 6, wherein a central drive motor is arranged in the opening for rotating the holding device about the vertical axis, wherein the supply conduit and the discharge conduit are guided through a central circular opening in the drive motor.

8. The parabolic trough collector according to claim 1, wherein the absorber pipe comprises a tubular supply conduit and a tubular discharge conduit for the heat transfer medium, wherein the supply conduit and the discharge conduit extend at least in sections in the area of the vertical axis and wherein in these sections at least one rotating joint is provided to permit a rotation of the holding device and thus the supply conduit and discharge conduit connected to it about the vertical axis.

9. The parabolic trough collector according to claim 1, wherein the absorber pipe comprises a tubular supply conduit and a tubular discharge conduit for the heat transfer medium, wherein the supply conduit and the discharge conduit are designed as flexible hoses at least in sections to permit a rotation of the holding device and thus the supply conduit and discharge conduit connected to it about the vertical axis.

10. The parabolic trough collector according to claim 1, wherein the edge lines extend outwards at an angle of about 10° to the connecting line of the corner points of the circular section.

11. The parabolic trough collector according to claim 1, wherein the diameter of the circular section is three to five times larger than the diameter of the absorber pipe, and in that the edge lines have a length which corresponds approximately to the diameter of the absorber pipe.

12. The parabolic trough collector according to claim 1, wherein the absorber pipe has a diameter of about 50 mm to 140 mm.

13. The parabolic trough collector according to claim 1, wherein the main reflector is flexible in shape and is arranged on a tensioning element which is suspended between the support arms.

14. The parabolic trough collector according to claim 13, wherein the tensioning element is pullable in the direction of the base to form a parabolic shape via a plurality of pulling means mounted at spaced engagement points and extending substantially vertically.

15. The parabolic trough collector according to claim 1, wherein each main reflector module comprises a flexible mirror foil or a plurality of substantially similar mirror plates or polished sheet metal plates whose width is about the diameter of the absorber pipe.

16. The parabolic trough collector according to claim 1, wherein the width of the main reflector modules is not constant along the aperture, but decreases from the focal line to the support arms.

17. The parabolic trough collector according to claim 1, wherein the main reflector has an aperture of more than 7 m.

18. The parabolic trough collector according to claim 1, wherein the holding device comprises at least one similar inner support struts extending centrally substantially parallel to the focal line of the main reflector for holding a maintenance device.

19. The parabolic trough collector according to claim 18, wherein at least one outer support strut is provided for holding the maintenance device.

20. The parabolic trough collector according to claim 1, wherein the absorber pipe comprises a plurality of parts connected by a flanged joint, the flanged joint comprising two respective end flanges and an adapter piece arranged therebetween.

21. The parabolic trough collector according to claim 20, wherein the adapter piece comprises an opening for the passage of the heat transfer medium and a plurality of elongated holes in the form of circular sections and arranged around the opening for the flexible connection of the end flanges, the elongated holes each extending over an angular range of from about 60° to about 75°.

22. The parabolic trough collector according to claim 21, wherein for holding the absorber pipe at least one of the adapter pieces is connected to an absorber pipe holder.

23. The parabolic trough collector according to claim 22, wherein the absorber pipe holder comprises a mounting plate which is movably connected to the adapter piece via elongated holes.

24. The parabolic trough collector according to claim 1, wherein the main reflector has a longitudinal axis which is inclined with respect to the surface of the base.

* * * * *